(12) United States Patent
Arisaka

(10) Patent No.: US 8,347,465 B2
(45) Date of Patent: Jan. 8, 2013

(54) CLIP

(75) Inventor: Oomi Arisaka, Yokohama (JP)

(73) Assignee: PIOLAX Inc., Kanagawa (JP)

( * ) Notice: Subject to any disclaimer, the term of this patent is extended or adjusted under 35 U.S.C. 154(b) by 1070 days.

(21) Appl. No.: 12/224,103

(22) PCT Filed: Feb. 16, 2007

(86) PCT No.: PCT/JP2007/052847
§ 371 (c)(1),
(2), (4) Date: Aug. 18, 2008

(87) PCT Pub. No.: WO2007/094453
PCT Pub. Date: Aug. 23, 2008

(65) Prior Publication Data
US 2009/0056087 A1    Mar. 5, 2009

(30) Foreign Application Priority Data

Feb. 17, 2006   (JP) .................. 2006-041073

(51) Int. Cl.
*A44B 1/04* (2006.01)
(52) U.S. Cl. ........................................ 24/297
(58) Field of Classification Search .................. 24/297, 24/452, 453, 458; 411/41, 44–48, 344
See application file for complete search history.

(56) References Cited

U.S. PATENT DOCUMENTS

| 829,837 | A | * | 8/1906 | Brisacher .................. 24/453 |
| 4,276,806 | A | | 7/1981 | Morel |
| 4,312,614 | A | | 1/1982 | Palmer et al. |
| 4,405,272 | A | | 9/1983 | Wollar |
| 4,571,134 | A | | 2/1986 | Beglinger et al. |
| 4,856,950 | A | | 8/1989 | Bushnell |
| 5,028,187 | A | | 7/1991 | Sato |
| 5,689,863 | A | | 11/1997 | Sinozaki |
| 5,704,746 | A | | 1/1998 | Leib et al. |
| 5,775,860 | A | * | 7/1998 | Meyer ............................. 411/46 |
| 6,364,586 | B1 | * | 4/2002 | Okada ............................. 411/41 |
| 6,511,273 | B2 | | 1/2003 | Arisaka |
| 6,533,515 | B2 | * | 3/2003 | Meyer ............................. 411/45 |
| 7,018,152 | B2 | | 3/2006 | Arisaka |
| 7,553,116 | B2 | * | 6/2009 | Lesecq ............................. 411/45 |
| 7,607,875 | B2 | * | 10/2009 | Shinozaki et al. ............. 411/45 |
| 2003/0129040 | A1 | * | 7/2003 | Arisaka ............................. 411/41 |
| 2004/0177480 | A1 | | 9/2004 | Kanie |
| 2004/0181917 | A1 | * | 9/2004 | Sawatani ........................ 24/297 |
| 2005/0019130 | A1 | * | 1/2005 | Kanie et al. .................... 411/45 |
| 2005/0220561 | A1 | | 10/2005 | Okada |

FOREIGN PATENT DOCUMENTS

| JP | 3-11115 | 2/1991 |
| JP | 5-302609 | 11/1993 |
| JP | 2002-106519 | 4/2002 |
| JP | 2003-106317 | 4/2003 |

* cited by examiner

*Primary Examiner* — Victor Batson
*Assistant Examiner* — Matthew Sullivan
(74) *Attorney, Agent, or Firm* — Jordan and Hamburg LLP

(57) ABSTRACT

A clip comprises a grommet and a pin, and the grommet has a flange and leg pieces. The flange has a pair of right and left flange bodies, bridges for joining the flange bodies, and an opening portion formed at the center portion thereof. Peripheral walls of the opening portion are formed by the respective end faces of the flange bodies and the bridges, and the right and left peripheral walls formed by the end faces of the flange bodies and the front and rear peripheral walls formed by the end faces of the bridges are offset in a thickness direction, thereby establishing a positional relationship in which the right and left peripheral walls and the front and rear peripheral walls do not intersect to each other.

13 Claims, 15 Drawing Sheets

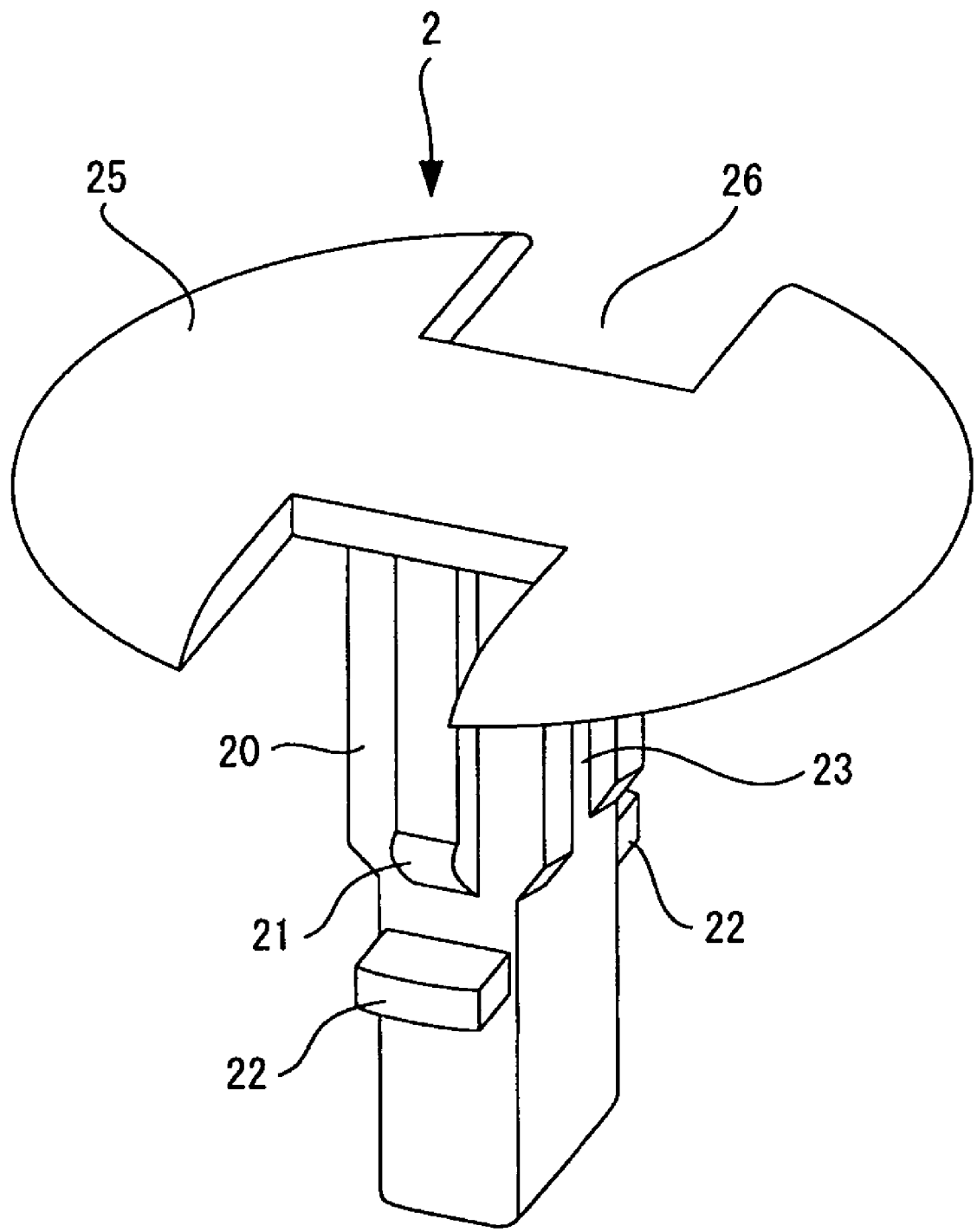

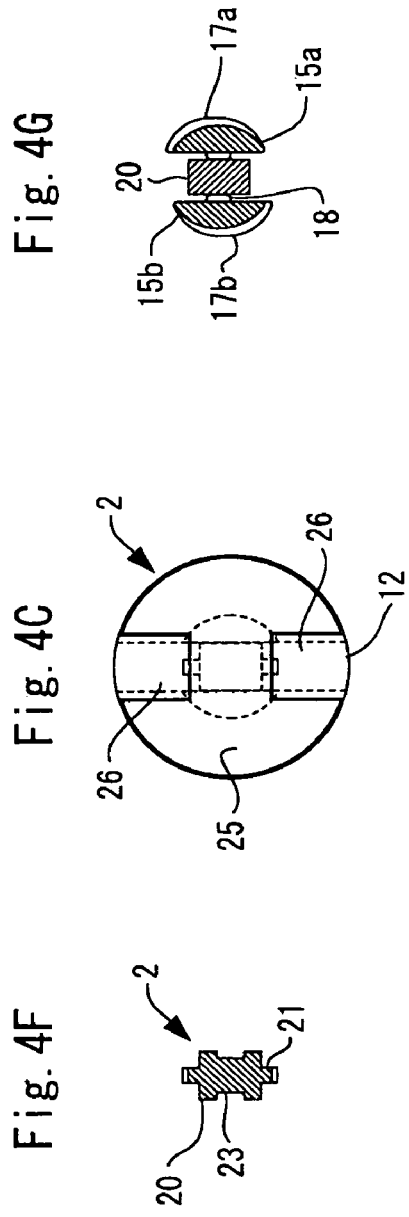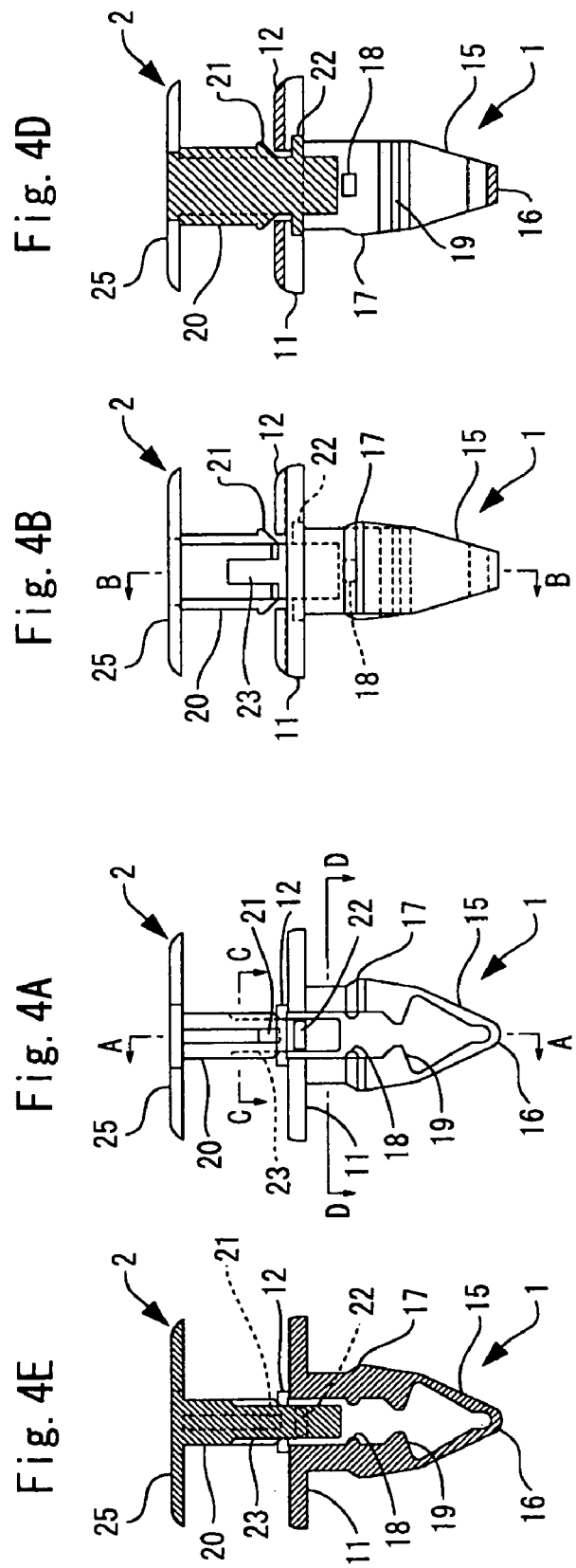

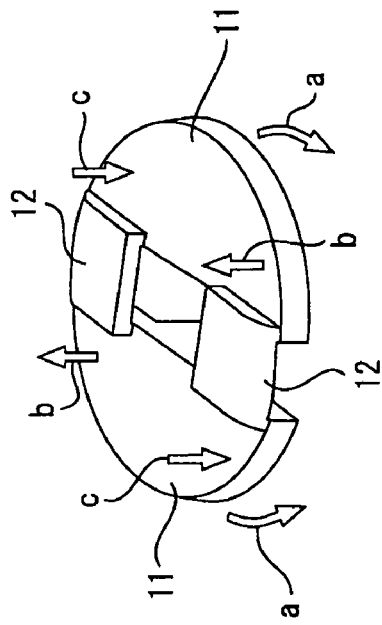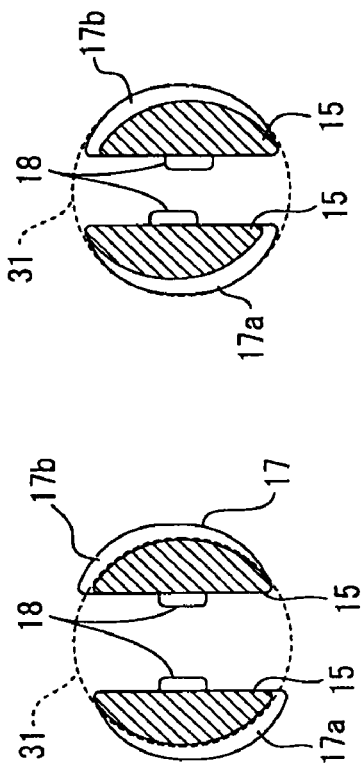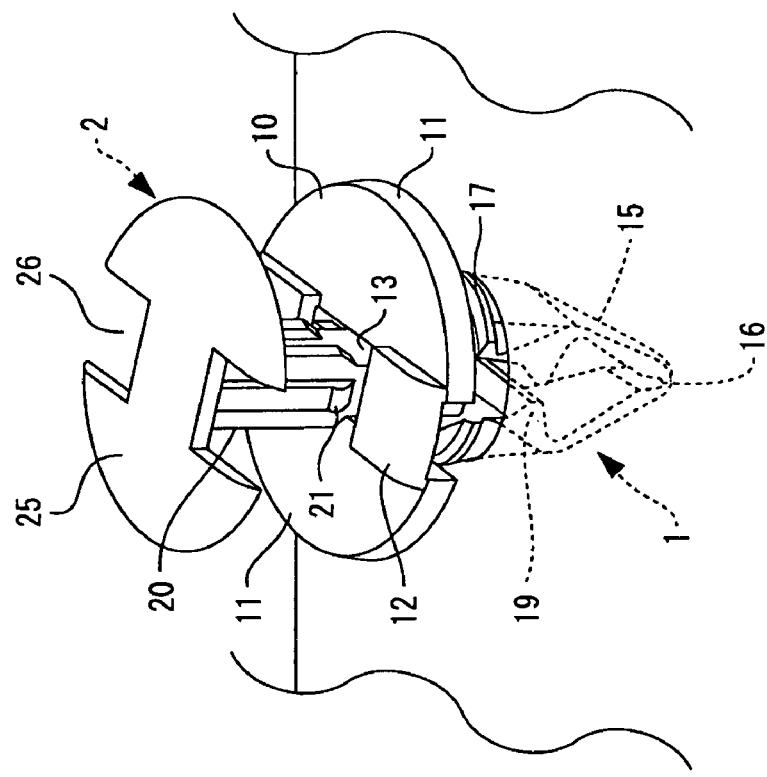

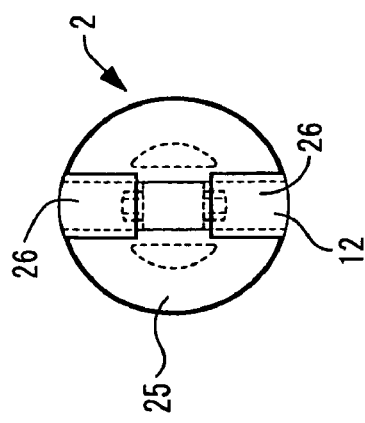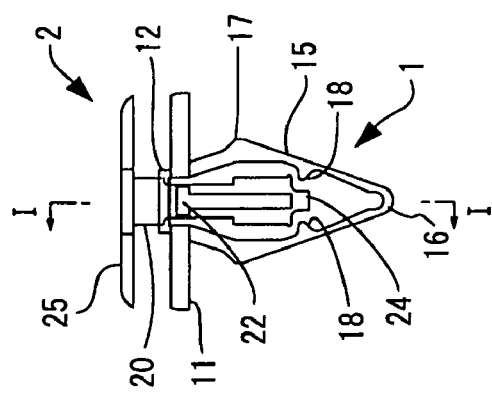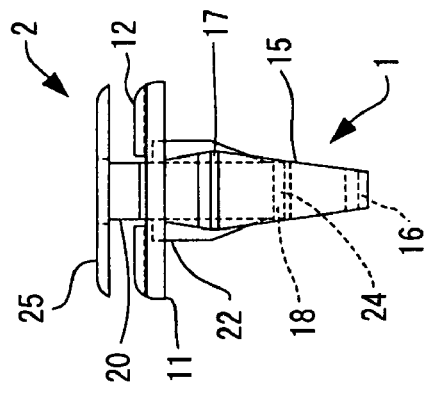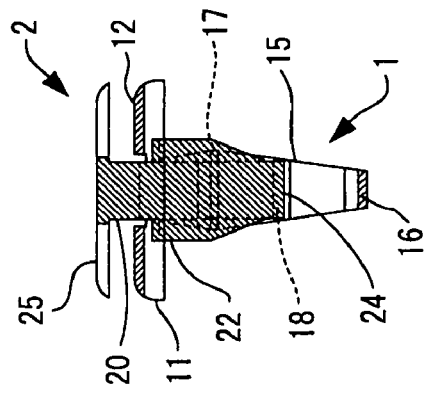

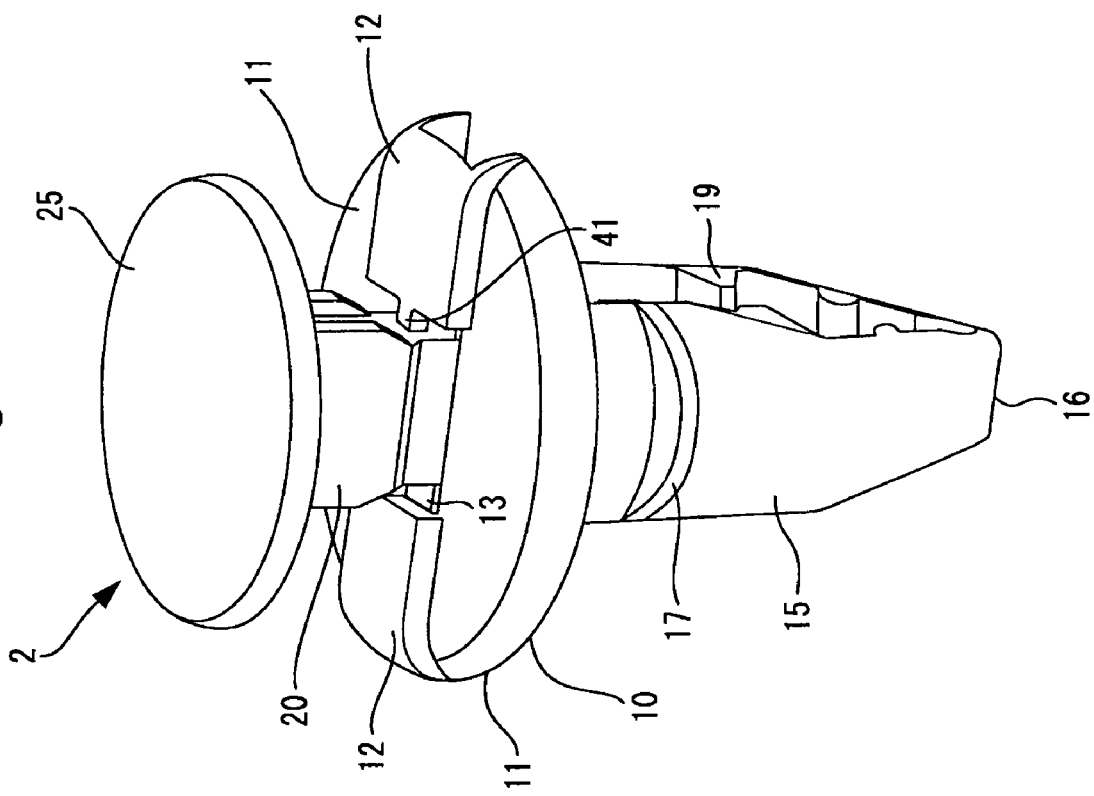

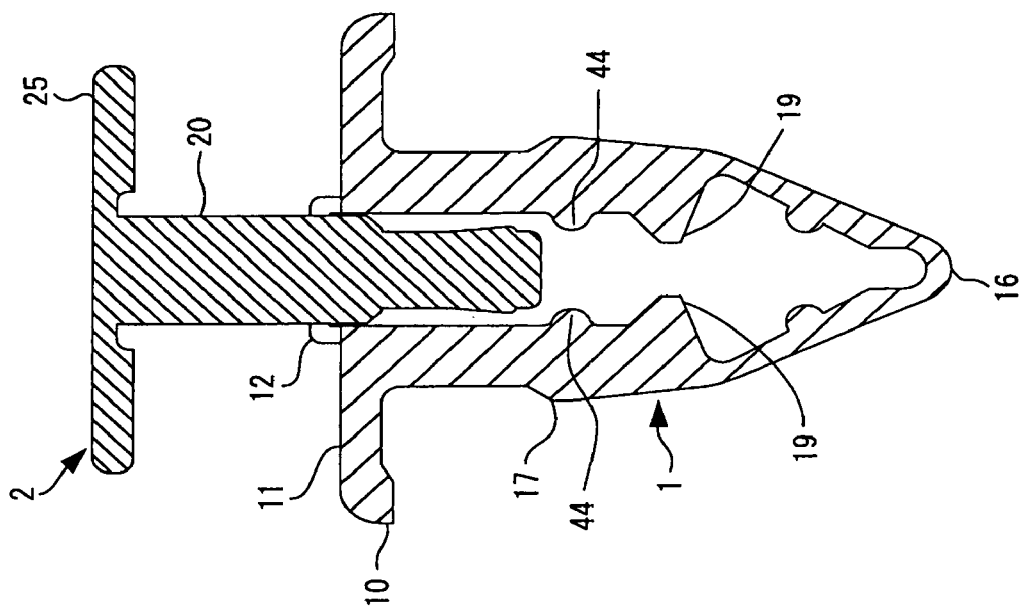
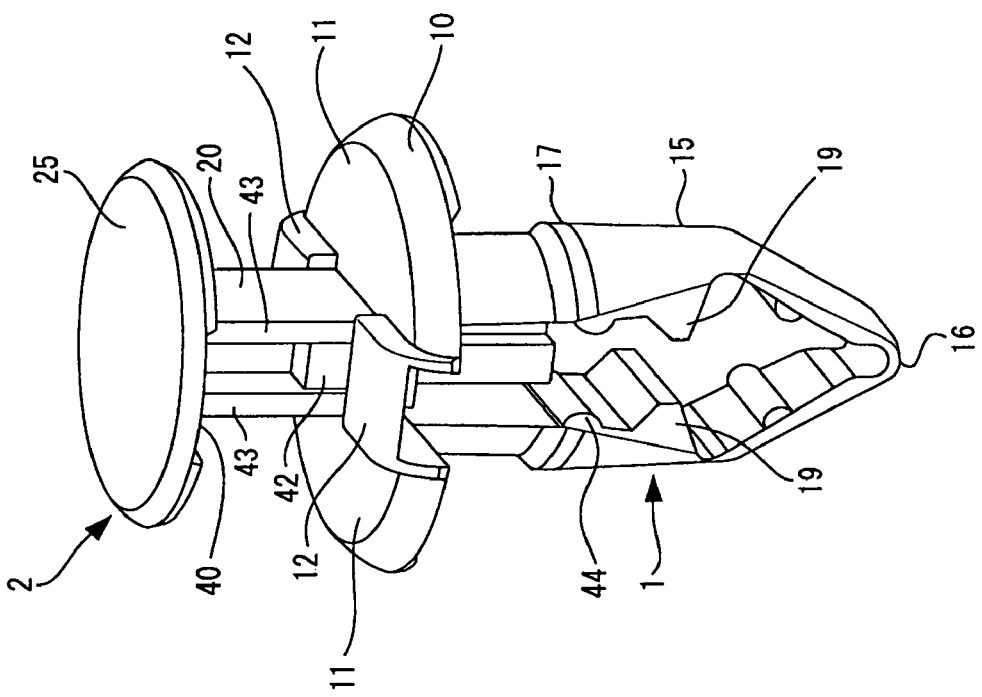

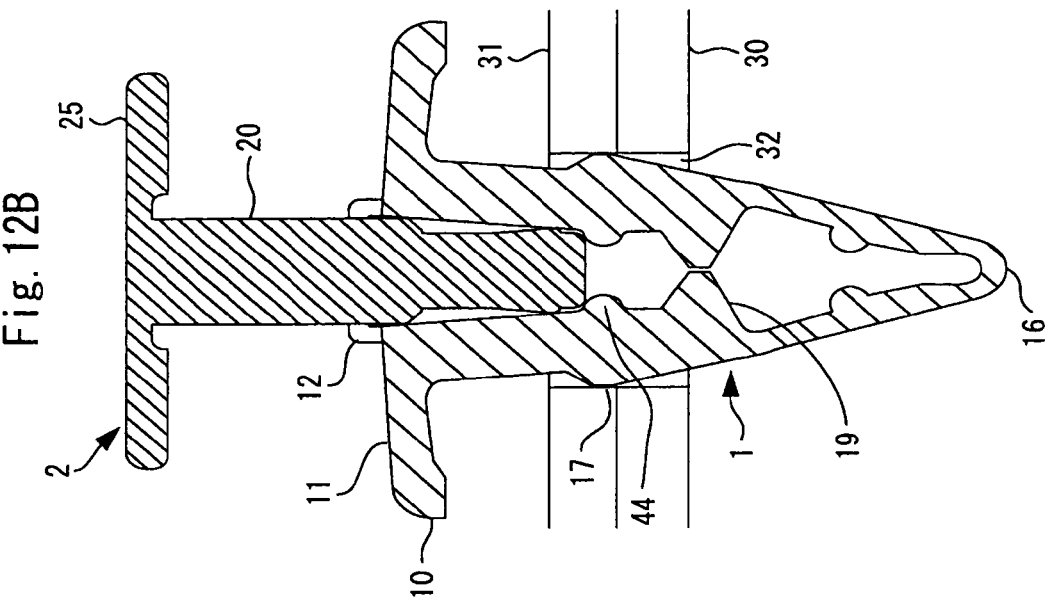
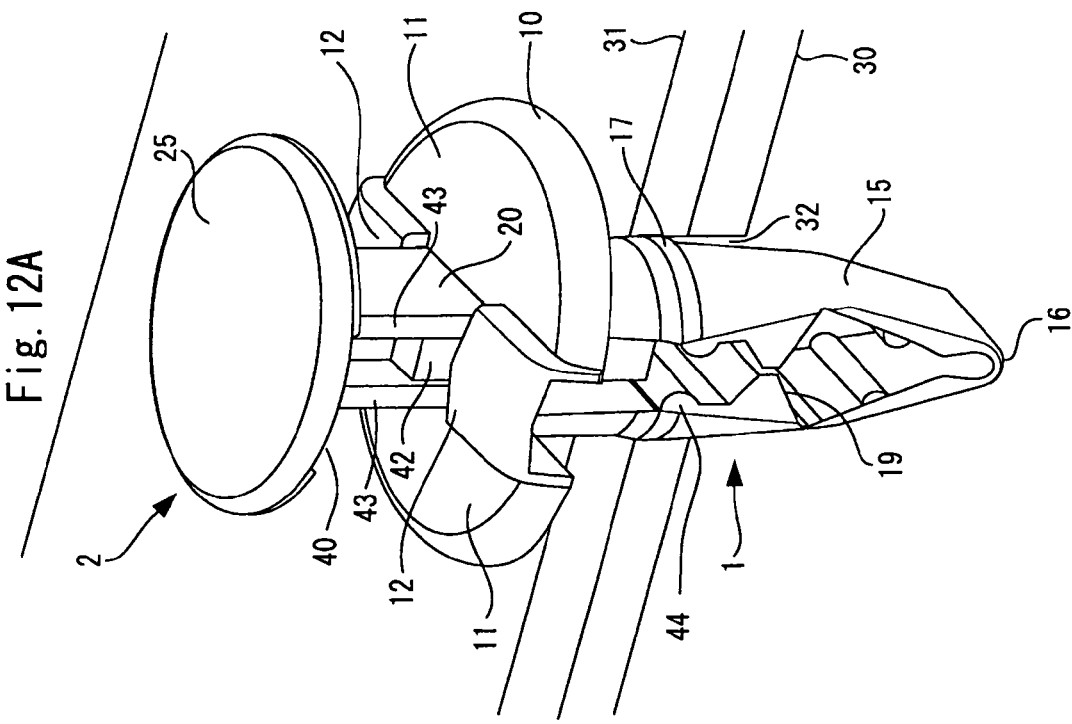

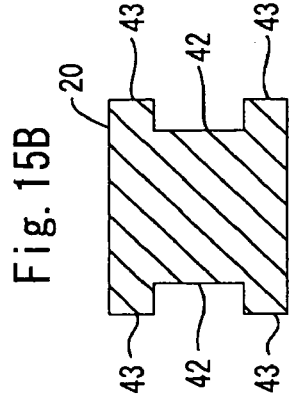
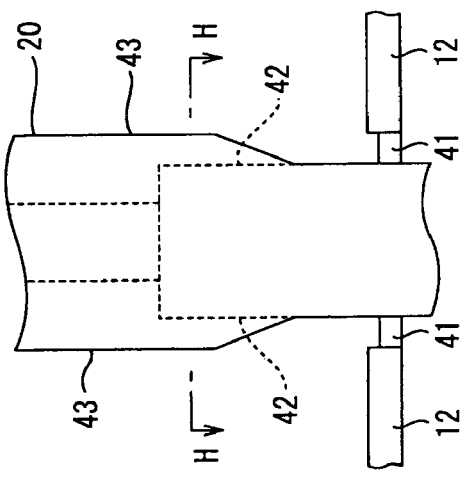
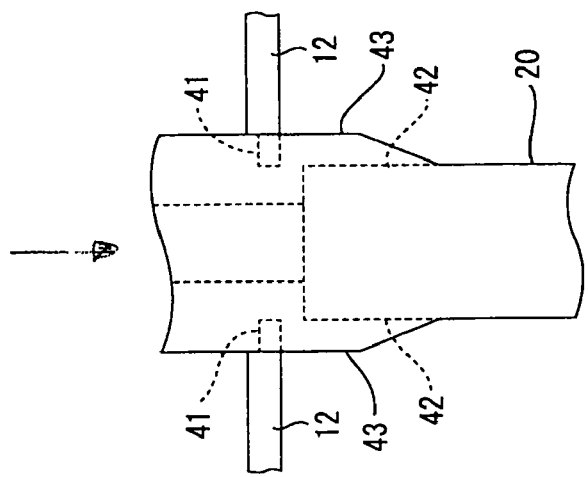

CLIP

TECHNICAL FIELD

The present invention relates to a clip used when an interior or exterior part of a vehicle is fixed to a panel or two panels are fixed while stacked.

BACKGROUND ART

This type of clip comprises two parts of a grommet and a pin. The grommet has a flange and leg pieces. The leg pieces is pushed into a fixing hole of an object to be fixed. When the pin is pushed into the center axial portion of the grommet, the pushing pressure of the pin acts on the leg portions, so that the leg pieces expand outwards. The grommet is fixed to the fixing hole of the object to be fixed as described above.

A clip in which a grommet and a pin are integrated with each other by partially joining them is known as one of this type of clips.

For example, Such a type of clips that parts other than the flange of the grommet are joined to the pin are disclosed in U.S. Pat. Nos. 4,312,614, 5,028,187, 5,689,863, 6,511,273, 7,018,152, US2004-0181917A1, etc.

With respect to the clips disclosed in these patent documents, a mold is opened and closed in the lateral direction to demold a grommet and a pin integrally. Accordingly, in order to demold the pin disposed at the center axial portion of the grommet, it is necessary to bisect the flange of the grommet and demold the pin from the interval between the respective bisected flanges.

Therefore, the flange of the grommet has a bisection structure, and thus there is a disadvantage that when the leg pieces of the grommet are pushed into the fixing hole of the object to be fixed, it is difficult to apply uniform pressure to the grommet and thus it is hard to handle the grommet.

On the other hand, there is known a clip in which the flange of the grommet is not bisected and the grommet is joined to the pin by the flange. This type of clips are disclosed in U.S. Pat. Nos. 4,276,806, 4,405,272, 4,856,950, US2005-0220561A1, etc.

With respect to the clips disclosed in these patent documents, a mold is inserted in the center axial direction of the grommet to demold the pin. Therefore, plural leg portions extending from the flange of the grommet are respectively separated from one another, and the leg portions are independent of one another.

The fixing hole of the object to be fixed may be located at a deep place, a step portion or the like, or it may be located at the back side of an interior or exterior part when viewed from a worker, so that the worker hardly visually recognize the fixing hole directly. In this case, the position of the fixing hole is groped or estimated on the basis of the relative positional relationship with other parts surrounding the fixing hole, the tips of the leg portions of the grommet are inserted into the fixing hole, and then the leg portions of the grommet are pushed in. A remarkable skill is required to push the independent plural leg portions into the fixing hole in a short time with no trouble by such a groping work.

Furthermore, U.S. Pat. Nos. 4,571,134 and 5,704,746 disclose clips having the structure that the flange is not segmented, plural leg pieces are joined to one another at the tips thereof, and the pin is joined to the flange of the grommet. The clips disclosed in these patent documents are constructed so that the lower end of the pin is joined to the flange. That is, the pin extends to the surface side of the flange and it is pushed to smash through the flange and intrude into the back surface of the flange. The clips discloses in the U.S. Pat. Nos. 4,276,806 and 4,856,950 have the same construction.

In the constructions as described above, it is necessary to accurately apply pressure to the pin in the axial direction, and when a bending moment acts on the pin, the pin turns over and thus it cannot be pushed into the back surface side of the flange.

DISCLOSURE OF THE INVENTION

Problem to be Solved by the Invention

The present invention has been implemented in view of the foregoing situation, and has an object to provide a clip in which a flange of a grommet is not segmented, plural leg pieces are joined to one another at the tips thereof, a pin penetrates through the flange, and the grommet and the pin can be simultaneously molded under the state that the pin is assembled to the grommet.

Means of Solving the Problem

In a clip comprising a grommet and a pin which are molded with resin, the grommet has a flange and a pair of leg pieces that extend from the back surface of the flange and is pushed into a fixing hole formed in an object to be fixed;

the flange has a pair of right and left flange bodies, a pair of bridges for joining the respective flange bodies and an opening portion formed at a center portion surrounded by the flange bodies and the bridges;

the pair of leg pieces are joined to each other at the tip portions thereof;

the pin has a shaft portion and a head portion formed at one end of the shaft portion;

the shaft portion penetrates through an opening portion of the flange; and peripheral walls of the opening portion are formed by respective end faces of the flange bodies and the bridges, and right and left peripheral walls formed by the end faces of the flange bodies and front and rear peripheral walls formed by the end faces of the bridges being set in such positional relationship that the right and left peripheral walls and the front and rear peripheral walls are offset in a thickness direction and do not intersect with one another.

As described above, according to the present invention, the front and rear peripheral walls and the right and left peripheral walls of the opening portion are set in such positional relationship that they are offset in the thickness direction and thus do not intersect with each other. Accordingly, a mold is inserted between the front and rear peripheral walls and between the right and left peripheral walls to form a shaft portion, whereby the shaft portion is separated from the flange, and the grommet and the pin can be simultaneously molded under the state that the pin is assembled to the grommet.

In addition, the flange is formed in a continuous ring shape without being segmented, so that high rigidity can be secured and handling is easy.

Furthermore, the tip portion of the shaft portion of the pin penetrates through the flange, and is disposed at the leg piece side. Therefore, when the pin is pushed in, the pin can be surely pushed into the leg piece side without turning over even if a slight bending moment acts on the pin.

The basic structure of the present invention is described above, however, the respective parts may be constructed as follows in the present invention.

The pair of leg pieces extend from the back surfaces of the pair of right and left flange bodies joined by the pair of bridges, and the pair of bridges are formed to be thinner than the flange bodies and elastically bendable.

According to the above construction, when the pair of leg pieces are pushed into the fixing hole of the object to be fixed, the leg pieces are pushed and compressed inwards (in the approach direction to each other), and the compression force is transmitted to the pair of bridges as bending force. Each bridge is bent and deformed by the bending force, so that the compression force acting on the leg pieces is relaxed, and thus the leg pieces can be easily pushed into the fixing hole of the object to be fixed by small force.

The pair of bridges project in the opposite direction to the leg pieces with respect to the surfaces of the pair of flange bodies.

According to the above construction, when the bending force from the leg pieces is applied to the bridges and thus the bridges sag, the bridges are located at the outside of the bending deformation (pulling side, that is, at the opposite side to the leg pieces), and thus they do not obstruct the bending deformation concerned. Accordingly, there is no risk that the bridges are pinched between the inwards-compressed leg pieces or between the rotationally displaced flange bodies or interferes in these elements. Therefore, the bridges sag surely and smoothly to relax the compression force acting on the leg pieces, and thus the leg pieces can be more easily pushed into the fixing hole of the object to be fixed by small force.

The pair of bridges can be elastically bent so that the front and rear end edges of the pair of right and left flange bodies are twisted and displaced in the vertically opposite directions.

Furthermore, the leg pieces extend from the back surfaces of the pair of flanges, and each of the leg pieces has, on the outer peripheral surface thereof, an fitting convex portion which is passed through a fixing hole having a circular section formed in the object to be fixed and fitted to an opening edge of the fixing hole.

Still furthermore, the respective outer peripheral edges of the fitting convex portions formed on the pair of leg pieces are formed in an arcuate shape so that the centers thereof correspond to positions offset from the center axis of the grommet in the front-and-rear direction.

According to the above construction, the outer peripheral edges of the offset fitting convex portions abut against the hole edge of the fixing hole of an object to be fixed and slide in a front-and-rear direction. By this sliding operation, the fitting convex portions of the leg pieces can be easily inserted into the fixing hole. In addition, the fitting convex portion is designed so that the outer peripheral edge thereof has an offset arcuate shape offset in the front-and-rear direction, and it passes through the fixing hole by the sliding movement in the front-and-rear direction and the inward movement Therefore, as compared with the structure that the clip is passed through the fixing hole by only the inward movement of the leg pieces, the outer peripheral edge can be expanded outwards. Therefore, the fitting convex portions of the expanding leg pieces can be more firmly fitted to the hole edge of the fixing hole, and thus the fastening force of the object to be fixed can be greatly enhanced.

Engaging recess portions are formed on the shaft portion of the pin, projecting pieces are formed on the inner surface of the leg pieces, and the projecting pieces of the leg pieces which are kept to be expanded by the shaft portion in connection with the pushing operation of the pin engaging recess are engaged with the engaging recess portions, thereby regulating the movement of the leg pieces in the front-and-rear direction.

According to the above construction, under the state that the pin is pushed in, the projecting pieces of the leg pieces are engaged with the engaging recess portions of the shaft portion to regulate the movement of the leg pieces in the front-and-rear direction. Accordingly, the rigidity of the leg pieces can be enhanced, the resistance force to external force acting on the clip is enhanced.

A push-in convex portion having the following constructions (1) to (3) is formed on the shaft portion of the pin.

(1) Before the shaft portion of the pin is pushed in a direction to the tip of the leg pieces of the grommet, the push-in convex portion is disposed between the head portion of the pin and the flange of the grommet.

(2) When the head portion of the pin is pushed to press the shaft portion in the direction to the tip of the leg pieces of the grommet, the push-in convex portion abuts against the flange of the grommet to transmit the pushing force to the flange.

(3) After the leg pieces of the grommet are pushed into the fixing hole of the object to be fixed and the flange abuts against the peripheral edge of the fixing hole, the push-in convex portion expands the opening by the pushing force and passes through the opening portion.

According to the above construction, when the head portion of the pin is pushed to press the shaft portion to the tip of the leg pieces, the pushing force is transmitted to the flange of the grommet through the push-in convex portion, and the leg pieces of the grommet are pushed into the fixing hole formed in the object to be fixed. Therefore, the pushing operation can be easily and surely performed.

The push-in convex portion abuts against the bridge of the flange to transmit the pushing force to the bridge.

According to this construction, the push-in convex portion abuts against the bridge, and thus when the leg pieces are pushed and compressed inwards (in the direction along which they approach each other) in connection with the pushing operation of the pin, the rotational displacement of the flange body by the bending force received from the leg pieces is not suppressed, and thus the bridge can be smoothly bent and deformed. Even if the push-in portion abuts against the flange body of the flange, a moment in the opposite direction to a moment generated in the flange body by the bending force received from the leg pieces is generated by the pushing force received from the push-in convex portion, and the respective moments are offset with each other, so that the rotational displacement of the flange body is suppressed.

A expanding and holding convex portion having the following constructions (a) (b) is formed on the inner surface of each of the leg pieces of the grommet.

(a) When the head portion of the pin is pushed to press the shaft portion in a direction to the tip of the leg pieces of the grommet, the tip of the shaft portion of the pin abuts against the expanding and holding convex portion, so that the expanding and holding convex portion receives the pushing force of the pin.

(b) After the leg pieces of the grommet are pushed into the fixing hole of the object to be fixed and the flange abuts against the peripheral edge of the fixing hole, the expanding and holding convex portion is pushed outwards by the pushing force received from the pin.

According to the above construction, the pair of leg pieces are kept to be pushed and compressed inwards while the leg pieces pass through the fixing hole of the object to be fixed, and thus the pushing force applied to the pin can be surely transmitted to the leg pieces through the expanding and holding convex portions, so that the leg pieces can be smoothly pushed into the fixing hole of the object to be fixed. When the formation portion of the expanding and holding convex portion passes through the fixing hole of the object to be fixed, the portion of the leg piece can expand outwards, and the tip of the shaft of the pin intrudes into the gap between the expanding and holding convex portions to push and expand the expanding and holding convex portions outwards, whereby the leg pieces can be surely fitted to the hole edge of the fixing hole.

The shaft portion is separated from the grommet, and dropout preventing convex portions are formed at the opposite position to the head portion through the flange, and the dropout of the shaft portion from the flange is regulated by the dropout preventing convex portions.

According to the above construction, it is unnecessary to break and separate the pin, so that no burr occurs.

A small piece for joining the bridge of the flange and the shaft portion of the pin is formed.

According to the above construction, backlash of the pin is prevented, and the clip can be easily handled when it is packaged and transported.

When the pin is pushed into the grommet, the small piece is broken at the boundary between the small piece and the shaft portion of the pin, and it remains while projecting to the bridge of the flange.

According to the above construction, even after the small piece is broken and the pin is separated from the flange, the small piece supports the pin from the outer periphery, so that backlash in the radial direction of the pin can be suppressed.

A guide face with which a small piece projecting from the bridge of the flange comes into sliding contact is formed on the shaft portion of the pin.

According to the above construction, the small piece also comes into sliding contact with the guide face when the pin is pushed in, so that the backlash of the pin is suppressed.

Furthermore, on the shaft portion of the pin is formed a projecting guide portion which comes into sliding contact with the end face of the bridge of the flange to guide the pin halfway in the operation of pushing the pin into the grommet.

The guide face is in sliding contact with the small piece at least until the projecting guide portion is in sliding contact with the inner surface of the bridge of the flange in the process of pushing the pin into the grommet.

According to the above construction, the pin guide and support based on the sliding contact of the small piece with the guide face is smoothly shifted to the more stable guide and support based on the sliding contact of the projecting guide portion of the pin with the end face of the bridge of the flange, so that the backlash of the pin can be suppressed and the stable pin pushing operation can be implemented.

BRIEF DESCRIPTION OF THE DRAWINGS

FIG. 3 is a perspective view showing the construction of a grommet of the clip according to the first embodiment of the present invention.

FIG. 4 is a front view showing the overall construction of the clip according to the first embodiment of the present invention. FIG. 4B is a side view. FIG. 4C is a plan view. FIG. 4D is a cross-sectional view of A-A line. FIG. 4E is a cross-sectional view of B-B line. FIG. 4F is a cross-sectional view of C-C line. FIG. 4G is a cross-sectional view of D-D line.

FIGS. 7A to 7D are diagrams showing the action of the clip according to the first embodiment of the present invention.

FIG. 8A is a front view showing the overall construction of a clip according to a second embodiment of the present invention. FIG. 8B is a side view. FIG. 8C is a plan view. FIG. 8D is a cross-sectional view of I-I line.

FIG. 10 is a perspective view showing the overall construction of a clip according to a third embodiment of the present invention.

FIG. 11A is a perspective view showing the operation of the clip according to the third embodiment of the present invention. FIG. 11B is a cross-sectional view.

FIG. 12A is a perspective view showing the operation of the clip according to the third embodiment according to the present invention subsequent to FIG. 11A. FIG. 12B is a cross-sectional view.

FIG. 14B is a cross-sectional view of X-X of FIG. 14A, and FIG. 14C is a cross-sectional view of Y-Y of FIG. 14A.

FIGS. 15A to 15C are diagrams showing a guide face and a projecting guide portion formed on the shaft portion. FIG. 15B is a cross-sectional view of H-H of FIG. 15A.

DESCRIPTION OF REFERENCE NUMERALS

1: grommet, 2: pin,
10: flange, 11: flange body, 12: bridge, 13: opening portion, 15: leg piece, 16: hinge portion, 17: fitting convex portion, 18: projecting piece, 19: convex portion for expanding and holding,
20: shaft portion, 21: push-in convex portion, 22: convex portion for preventing dropout, 23: fitting recess portion, 24: push-in end portion, 25: head portion, 26: cut-out portion
30, 31: panel, 32: fixing hole
40: recess groove, 41: small piece, 42: guide face, 43: projecting guide portion, 44: push-in receiving portion

BEST MODES FOR CARRYING OUT THE INVENTION

Embodiments according to the present invention will be described in detail with reference to the drawings.

(First Embodiment)

FIGS. 1 to 7D are diagrams showing the construction of a clip according to a first embodiment of the present invention.

In the description of the clip of the present invention, the up-and-down direction and the right-and-left direction will be defined on the basis of FIG. 4A except as otherwise noted, and also the right-and-left direction in FIG. 4B is set as the front-and-rear direction.

Figure 1:
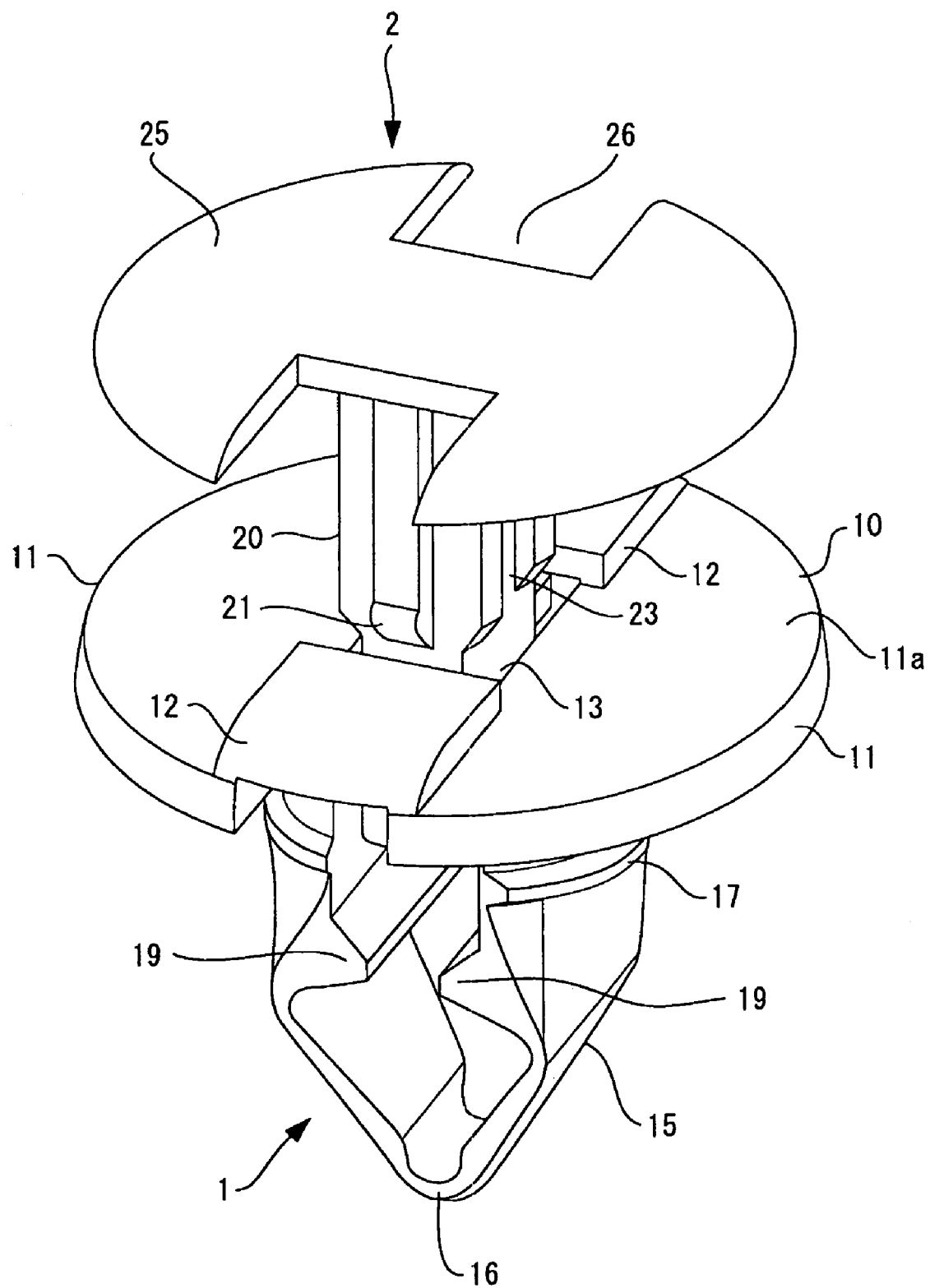
FIG. 1 is a perspective view showing the overall construction of a clip according to a first embodiment of the present invention.
Figure 2:
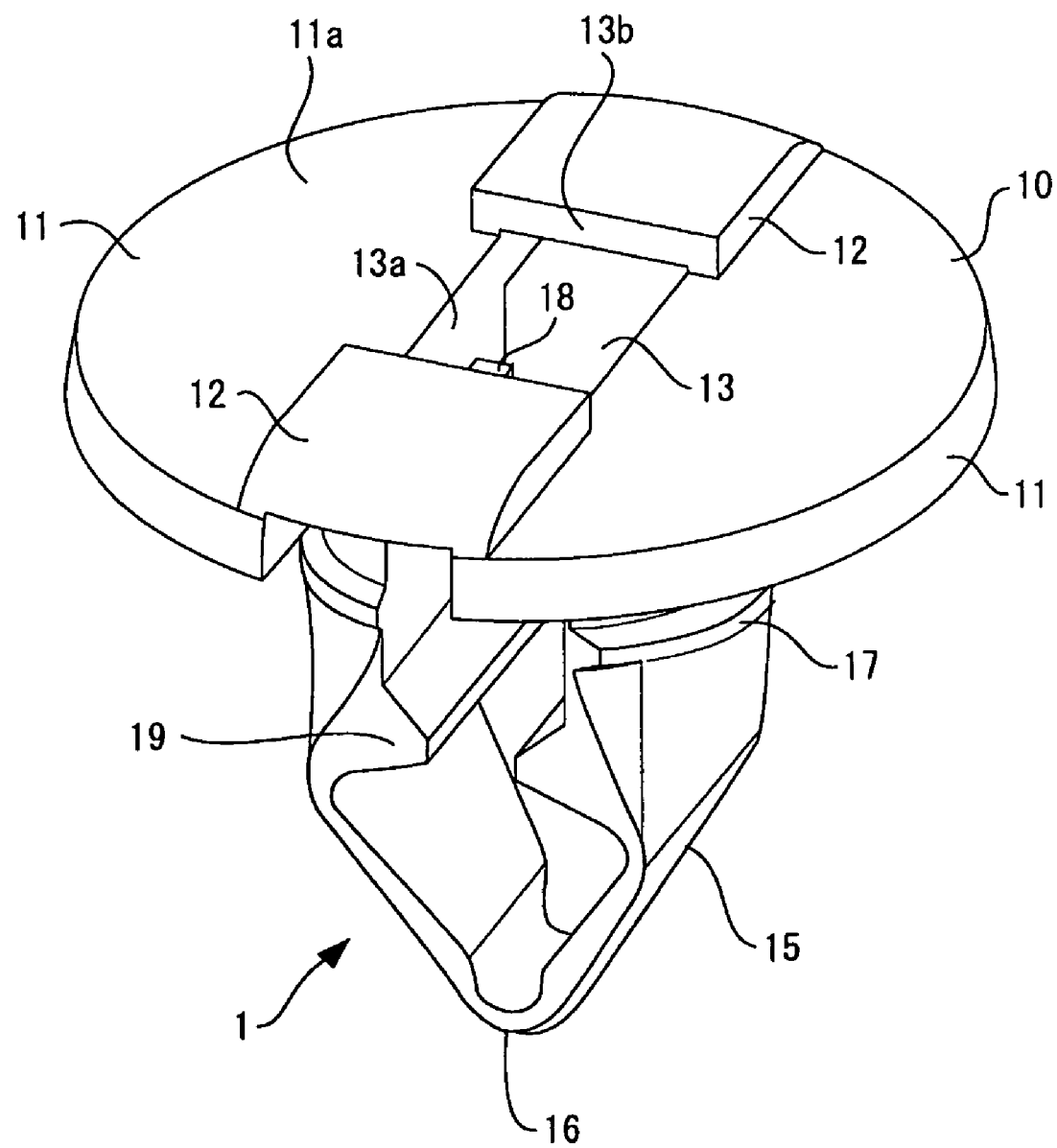
FIG. 2 is a perspective view showing the construction of a pin of the clip according to the first embodiment of the present invention.

As shown in FIG. 1, the clip of the first embodiment comprises two parts of a grommet 1 and a pin 2 which are simultaneously formed of synthetic resin by injection molding. The grommet 1 has a disc-shaped flange 10 and a pair of leg pieces 15 extending from the back surface (the lower surface of FIG. 1) of the flange 10. The pin 2 has a shaft portion 20 and a head portion 25 formed at one end of the shaft portion 20. The pin 2 is assembled to the grommet 1 under the state that the shaft portion 20 penetrates through an opening portion 13 of the flange 10 described later and is freely slidable in the axial direction.

The flange 10 comprises a pair of right and left flange bodies 11, and a pair of front and rear bridges 12. The flange 10 is formed in a continuous ring shape without being segmented so that the pair of right and left flange bodies 11 are joined to each other at the front and rear portions by the bridges 12.

The center portion of the flange 10 is formed as the rectangular opening portion 13 surrounded by the flange bodies 11 and the bridges 12. This opening portion 13 is surrounded by peripheral walls 13a at the right and left sides and peripheral walls 13b at the front and rear sides (see FIG. 2). The right and left peripheral walls 13a are formed by the end faces of the flange bodies 11 at the right and left sides. The front and rear peripheral walls 13b are formed by the end faces of the bridges 12 at the front and rear sides.

The right and left peripheral walls 13a and the front and rear peripheral walls 13b are formed to be offset from each other in the thickness direction (in the vertical direction of FIG. 2), and thus they are in such positional relationship that they do not intersect with each other. That is, the back surfaces (the lower surfaces in FIG. 2) of the bridges 12 are located at the outside (at the upper side) of the surfaces (the upper surfaces in FIG. 2) of the flange bodies 11.

As described above, the right and left peripheral walls 13a and the front and rear peripheral walls 13b at the opening portion 13 are formed to be offset from each other in the thickness direction, whereby the clip of this embodiment can be demolded so that the shaft portion 20 of the pin 2 penetrates through the opening portion 13.

Next, the demold structure for the flange of the grommet and the shaft portion of the pin will be described with reference to FIGS. 5A and 5B.

In the clip of this embodiment, with respect to the surfaces (upper surfaces) 11a of the flange bodies 11 of the flange 10, the upper portion above these surfaces 11a is molded by using an upper mold 100, and the lower portion below these surfaces 11a is molded by using a lower mold 200. The upper mold 100 and the lower mold 200 comprise fixed molds 101, 201 and movable molds 102, 202. The movable mold 102 of the upper mold 100 is freely openable and closable in the right-and-left direction. The movable mold 202 of the lower mold 200 is freely openable and closable in the front-and-rear direction.

Figure 5B:
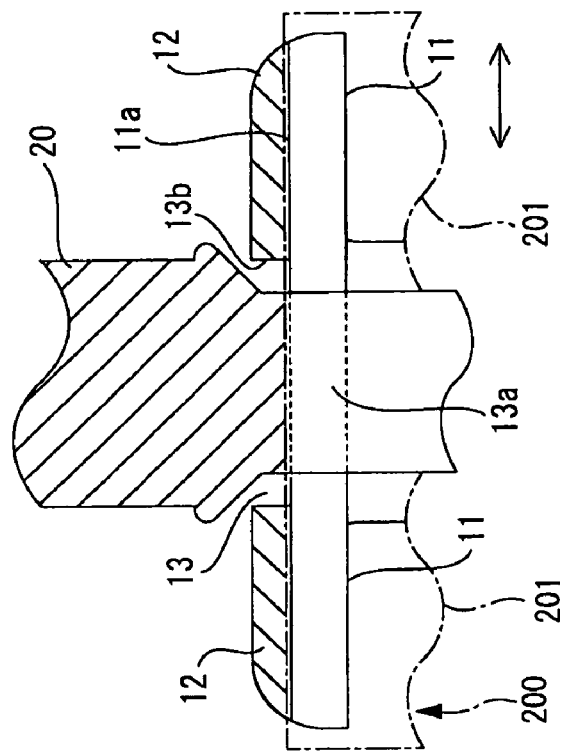
FIG. 5B is a side cross-sectional view.
Figure 5A:
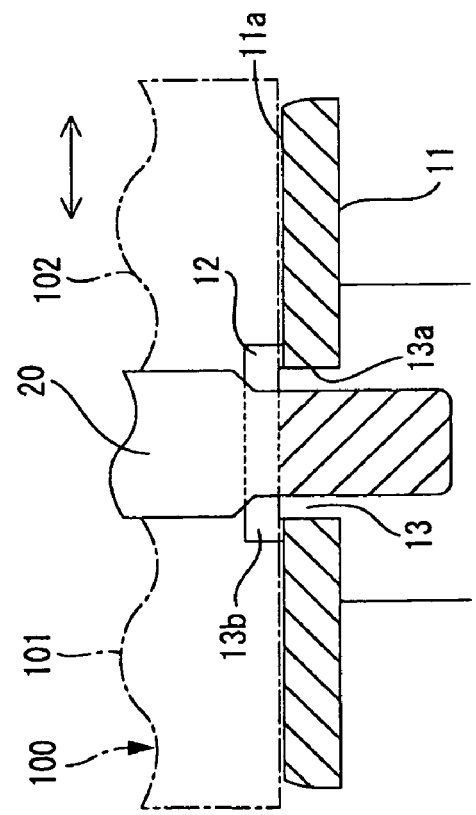
FIG. 5A is a front-side cross-sectional view showing a demold structure for the flange of the grommet and the shaft portion of the pin.

As shown in FIG. 5A, the upper portion above the surfaces 11a of the flange bodies 11, containing the shaft portion 20, is molded by the upper mold 100. That is, the hatched portion in FIG. 5B is molded by the upper mold 100. At this time, the upper mold 100 intrudes into a portion of the opening portion 13 which is sandwiched by the front and rear peripheral walls 13b in the flange 10, thereby forming the shaft portion 20.

As shown in FIG. 5B, the lower portion below the surfaces 11a of the flange bodies 11, containing the shaft portion 20, is molded by the lower mold 200. That is, the hatched portion in FIG. 5A is molded by the lower mold 200. At this time, the lower mold 200 intrudes into a portion of the opening portion 13 which is sandwiched by the right and left peripheral walls 13a in the flange 10, thereby forming the shaft portion 20.

The front and rear peripheral walls 13b of the opening portion 13 and the right and left peripheral walls 13a are formed to be offset from each other in the thickness direction (in the vertical direction in FIG. 2) as described above, thereby establishing the positional relationship that they do not intersect with each other. Accordingly, the upper portion of the shaft portion 20 above the surfaces 11a of the flange bodies is molded by the upper mold 100, and also the lower portion of the shaft portion 20 below the surfaces 11a of the flange bodies is molded by the lower mold 200. When the molds 100, 200 are opened, the shaft portion 20 molded by the respective molds is formed under the state that it is separated from the respective peripheral walls 13a, 13b (that is, the flange 10) and penetrates through the opening portion 13. As described above, the shaft portion 20 is molded so as to be separated from the flange 10, so that occurrence of burr which is caused by breaking in the prior art can be prevented.

The construction of the grommet 1 will be described again.

The pair of leg pieces 15 constituting a part of the grommet 1 extend downwardly from the back surfaces (the lower surfaces in FIG. 2) of the pair of flange bodies 11. The pair of leg pieces 15 mutually confront each other, and the confronting surfaces thereof correspond to the inner peripheral surfaces. The outer peripheral surfaces of the leg pieces 15 respectively have a slant surface inclined inwards at the lower portion thereof which is located at the lower side of the intermediate portion thereof, and the respective leg pieces 15 are joined to each other at the tip portions thereof (the lower end portions thereof in FIG. 2). The apex portion of the joined leg pieces forms a thin hinge portion 16. A fitting convex portion 17 which is upheaved like a mountain is formed on the outer peripheral surface of each leg piece between the proximity of the start end of the slant surface and the flange 10. A projecting piece 18 which projects inwards is formed substantially at the back side position of the fitting convex portion 17 on the inner peripheral surface of the leg piece 15, and a convex portion 19 for expanding and holding which is designed like a mountain is formed at the lower side of the projecting piece 18.

Each bridge 12 of the flange 10 is formed to be thinner than the flange bodies 11, and it is elastically bendable as indicated by an arrow a in FIG. 7B (see FIG. 7B). As described later, when the pair of leg pieces 15 are pushed into the fixing hole 32 of a panel 30, 31 as an object to be fixed, the leg pieces 15 are pushed and compressed inwards, and the compression force is transmitted as bending force to the pair of bridges 12. Each bridge 15 is bent and deformed by the bending force, so that the compression force acting on the leg pieces is relaxed and thus the leg pieces 15 can be easily pushed into the fixing hole 32 by small force.

Furthermore, each bridge 12 is formed to project from the surface side of the pair of flange bodies 11 to the opposite side to the leg pieces 15. Accordingly, when the bridges 12 suffer the bending force from the leg pieces 15 to be bent, the bridges 12 are disposed at the outside of the bending deformation (at the pull side, that is, at the opposite side to the leg pieces). Accordingly, the bridges 12 do not obstruct the bending deformation, and there is no risk that the bridges 12 are pinched between the inward pushed and compressed leg pieces 15 or between the rotationally displaced flange bodies 11, or interfere with the respective parts 15, 11.

Furthermore, the pair of bridges 12 of the flange 10 are spaced from each other through the opening portion 13 by a predetermined distance, and thus they can be elastically bent so that the front and rear outer end edges of the respective flange bodies 11 are twisted and displaced in the vertically opposite directions (the directions indicated by arrows b, c in FIG. 7B).

Furthermore, in this embodiment, the outer peripheral edges of the fitting convex portions 17 (17a, 17b) formed on the respective leg pieces 15 are formed in an arcuate shape, and the center positions of the arcuate shapes of the outer peripheral edges correspond to the positions obtained by offsetting the center axis of the grommet 1 in the front and rear opposite directions respectively as shown in FIGS. 4G and 7C.

With respect to the fitting convex portions 17 (17a, 17b) having the offset arcuate peripheral edges, when the front and rear outer end edges of the respective flange bodies 11 move in the vertically opposite directions in connection with the bending deformation of the bridges 12, the center of curvature of the arcuate outer peripheral edge approaches to the center axis of the grommet 1. Accordingly, the outer peripheral edges of the fitting convex portions 17 (17a, 17b) fall in a virtual circle 31 containing the axis of the grommet 1 at the center (that is, in the fixing hole of the object to be fixed) (see FIG. 7D).

Next, the structure of the pin 2 will be described in more detail. As shown in FIGS. 3, 4A to 4G, push-in convex portions 21, convex portions 22 for preventing dropout and engaging recess portions 23 are formed on the outer peripheral surface of the shaft portion 20 of the pin 2.

The push-in convex portions 21 are formed to confront the bridges 12 of the flange 10, that is, formed on the front and rear surfaces of the shaft portion 20 so as to project outwards. These push-in convex portions 21 have taper faces at the lower end portions thereof, and the tapered faces abut against the opening edge portion of the opening portion 13, that is, the end edges of the bridges 12.

The convex portions 22 for preventing dropout are formed on the front and rear surfaces of the shaft portion 20 to be nearer to the tip of the shaft portion 20 than the push-in convex portions 21 so as to project outwards. The dropout preventing convex portions 22 remarkably project to the outside of the opening edge portion of the opening portion 13, and the dropout preventing convex portions 22 interfere with the flange 11 (more specifically, the bridges 12) so that the tip portion of the shaft portion 20 can be prevented from dropping out from the opening portion 13.

The base portion of the shaft portion 20 (the portion near to the flange 10) has a sufficient width in the right and left direction so that the base portion is fitted in the opening portion 13 without being jounced. A fitting recess portion 23 extending in the axial direction is formed on the base portion. Under the state that the pin 2 is pushed in, the projecting piece 18 of the leg piece 15 described above is fitted in the fitting recess portion 23 to regulate the movement in the front and rear direction of the leg piece 15.

Those portions of the head portion 25 of the pin 2 which confront the bridges 12 of the flange 10 are cut out as cut-out portions 26. Under the state that the pin 2 is pushed in, the bridges 12 is engaged with the cut-out portions 26 to form a head surface having little unevenness.

Next, the operation when two panels (objects to be fixed) are stacked and fixed by the clip of this embodiment will be described with reference to FIGS. 6A to 6D and FIGS. 7A to 7D.

Figure 6A:
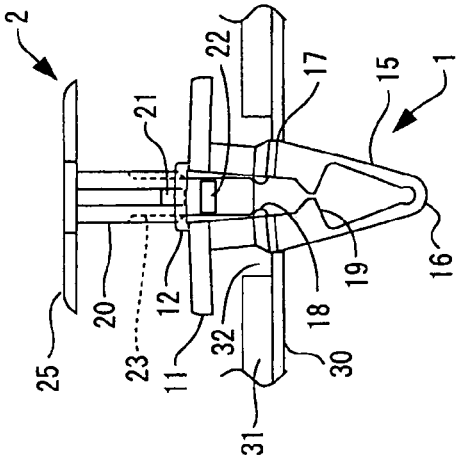
FIGS. 6A to 6D are front views showing the operation of the clip according to the first embodiment of the present invention.

As shown in FIG. 6A, a fixing hole 32 which is circular in section is formed at a proper position of the two stacked panels 30, 31. The clip of this embodiment is inserted into the fixing hole 32 by pushing the leg pieces 15 of the grommet 2 from the hinge portion 16 side into the fixing hole 32. At this time, when the head portion 25 of the pin 2 is pushed, the push-in convex portions 21 of the shaft portion 20 abut against the bridges 12 of the flange 10, and thus the pushing force is transmitted to the grommet 1 through the push-in convex portions 21.

Figure 6B:
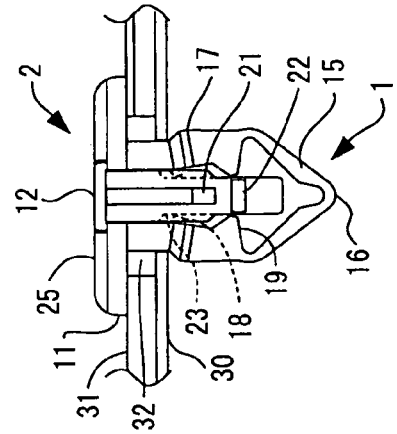
Figure 6C:
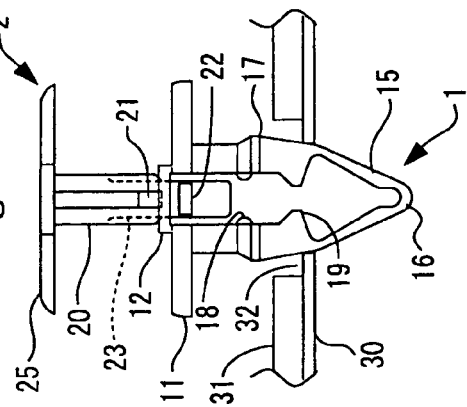

When the clip is further pushed, the slant surfaces of the leg pieces 15 of the grommet 1 abut against the hole edge of the fixing hole 32 of the panel 30 and thus are pushed and compressed inwards (see FIG. 6B). The bending force at this time is transmitted to the bridges 12 of the flange 10. Here, the bridges 12 are thinner than the flange bodies 11, and thus they are liable to be bent. In addition, the bridges 12 located on the surface of the flange 10 are far away from the slant surfaces of the leg pieces 15 abutting against the hole edge of the hole 32 of the panels (that is, the acting point of the bending force), and thus the bridges 12 suffer a large moment. As a result, the bridges 12 are elastically bent as indicated by an arrow a of FIG. 7B (see FIG. 7B). In connection with the bending deformation of the bridges 12, the flange bodies 11 are rotationally displaced, and the right and left outer end edges thereof are downwardly moved, so that the leg pieces 15 are further displaced inwards. As described above, the clip of this embodiment displaces the leg pieces 15 inwards by the elastic bending deformation of the bridges 12, so that the clip can be easily pushed into the fixing hole 32 without greatly deforming the leg pieces 15, and thus the reduction in strength due to the deformation of the leg pieces 15 can be suppressed.

In this embodiment, the push-in convex portion 21 abuts against the bridge 12 as described above, and thus when the leg pieces 15 are pushed and compressed inwards (in the direction along which they approach each other) in connection with the pushing operation of the pin 2, the bridges 12 can be smoothly bent and deformed without suppressing the rotational displacement of the flange bodies 11 by the bending force applying from the leg pieces 15.

When the clip is further pushed, the outer peripheral edges of the offset fitting convex portions 17 shown in FIG. 7C abut against the hole edge of the fixing hole 32 of the panel 30, and slide in the front-and-rear direction. This sliding operation, the inward bending deformation of the leg pieces 15 and the inward displacement of the leg pieces 15 due to the bending deformation of the bridges 12 are superimposed with one another, so that the leg pieces 15 are pushed and compressed inwards as shown in FIG. 7D. As a result, the leg pieces 15 can be pushed into the fixing hole 32 easily.

As shown in FIG. 6B, at the stage that the fitting convex portions 17 of the grommet 1 is about to enter the fixing hole 32, the respective projecting pieces 18 provided on the inner peripheral surfaces of the pair of leg pieces 15 are moved inwards, and thus the tip of the shaft portion 20 of the pin 2 abuts against the projecting pieces 18. The pin 2 is latched by the projecting pieces 18, whereby the clip can push both the pin 2 and the grommet 1 by merely pushing the upper surface of the head portion 25 even under the state that the frictional force between the fixing hole 32 and the fitting convex portion 17 is maximum.

When the apex portion of the fitting convex portion 17 of the grommet 1 passes over the fixing hole 32, the clip elastically expands the leg pieces 15 so that the leg pieces 15 are restored to the original state. Accordingly, the latch of the tip of the shaft portion 20 by the projecting pieces 18 is released. Furthermore, by the elastic deformation of the bridges, the push-in convex portions 21 overrides the bridges 12 of the flange 10. Subsequently, the tip of the shaft portion 20 abuts against the convex portions 19 for expanding and holding, and pushes the grommet 1 downwardly, whereby the clip is pushed down until the flange 10 of the grommet 1 abuts against the panel 31 (see FIG. 6C).

Figure 6D:
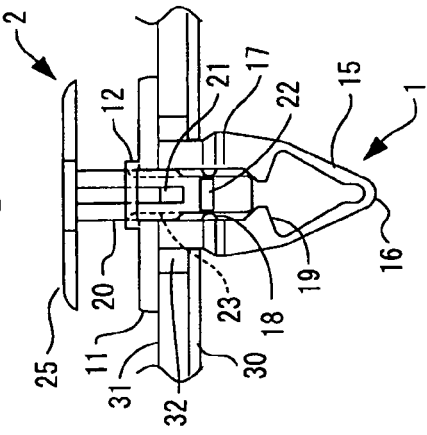

Furthermore, when the upper surface of the pin 2 is pushed, the tip of the shaft portion 20 of the pin 2 is pushed in beyond the expanding and holding convex portions 19 as shown in FIG. 6D. At this time, the expanding and holding convex portions 19 of the grommet 1 are outwards pushed and expanded by the shaft portion 20, so that the respective leg pieces 15 are expanded to the right and left sides. Accordingly, the fitting convex portions 17 of the expanding leg pieces 15 are fitted to the hole edge of the fixing hole 32 of the panel 30, whereby the two panels 30, 31 can be fastened to each other.

Here, the fitting convex portions 17 of the leg pieces 15 are designed in an arcuate shape so that the outer peripheral edges thereof are offset from each other in the front and rear direction, and pass through the fixing hole 32 by the slide in the front and rear direction and the inward movement thereof. Accordingly, as compared with the structure that they pass through the fixing hole 32 by only the inward movement of the leg pieces 15, the outer peripheral edges can be outwards expanded. Therefore, the fitting convex portions 17 of the expanding leg pieces 15 can be further firmly fitted to the hole edge of the fixing hole 32, so that the fastening force of the panels 30, 31 can be greatly enhanced.

Under the state that the pin 2 is pushed in as descried above, the fitting recess portions 23 of the shaft portion 20 are engaged with the projecting pieces 18 of the leg pieces 15 to regulate the movement of the leg portions 15 in the front and rear directions (see FIG. 6D), whereby the rigidity of the leg pieces 15 is enhanced and the resistance force to the external force acting on the clip can be enhanced.

The clip is detached by inserting a tool such as a driver or the like into the gap between the flange 10 of the grommet 1 and the head portion 25 of the pin 2 and lifting up the head portion 25 of the pin 2, whereby the expansion state of the leg pieces 15 held by the shaft portion 20 of the pin 2 is released and thus the leg pieces 15 can be pulled out from the fixing hole 32 by drawing out the pin 2.

(Second Embodiment)

Next, a clip according to a second embodiment of the present invention will be described with reference to FIGS. 8A to 8D and FIGS. 9A and 9B.

In the clip according to the second embodiment, the same parts as or corresponding parts to those of the clip of the first embodiment are represented by the same reference numerals, and the detailed description thereof is omitted.

As in the case of the first embodiment, the clip of the second embodiment comprises two parts of a grommet 1 and a pin 2 which are simultaneously molded with synthetic resin by injection molding. As shown in FIGS. 8A to 8D, the grommet 1 is constructed so that only the expanding and holding convex portions 19 project from the inner peripheral surfaces of the leg pieces 15. Furthermore, a push-in end portion 24 whose right and left corner portions are cut out in a curved-shape is formed at the tip of the shaft portion 20 of the pin 1.

In this embodiment, the clip is simultaneously molded under the state that the shaft portion 20 of the pin 2 penetrates through the opening portion 13 of the grommet 1 and is assembled to the grommet 1.

Figure 9A:
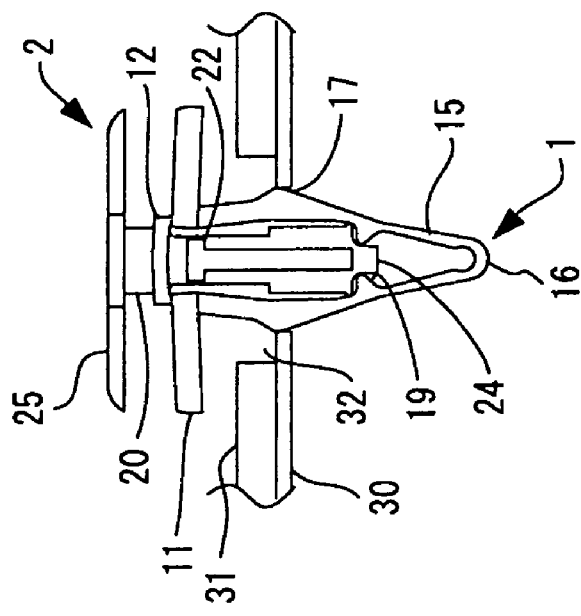
FIGS. 9A and 9B are front views showing the operation of the clip according to the second embodiment.

In the case of the clip of this embodiment, the leg pieces 15 of the grommet 1 are pushed into the fixing hole 32 of the two stacked panels 30, 31 (objects to be fixed) as shown in FIG. 9A. At this time, the fitting convex portions 17 of the leg pieces 15 is fitted to the hole edge of the fixing hole 32, so that the leg pieces 15 sag inwards. By the sagging of the leg pieces 15, the expanding and holding convex portion 19 is moved and pushed inwards, and hooked to the curved site of the push-in end portion 24. The pushing force of the pin 2 is transmitted to the grommet 1 through the engagement between the push-in end portion 24 and the expanding and holding convex portion 19.

Figure 9B:
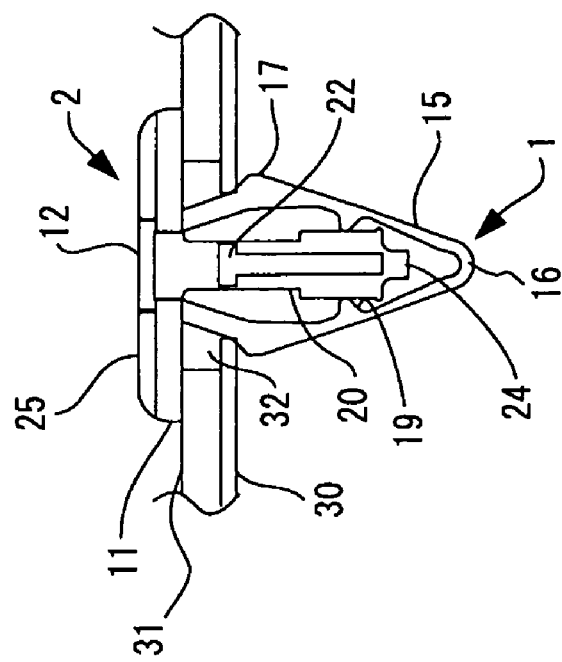

When the pin 2 is pushed, the fitting convex portions 17 of the leg pieces 15 pass over the fixing hole 32, and the elastic pieces 15 are elastically restored to the original state. Furthermore, by the push-in end portion 24 of the shaft portion 20, the expanding and holding convex portion 19 of the leg pieces 15 is outwards pushed and expanded, and the fitting convex portions 17 of the leg pieces 15 are fitted to the hole edge of the fixing hole 32 as shown in FIG. 9B.

It is needless to say that the clip of this embodiment has the function of easily inserting the leg pieces 15 into the fixing hole 32 by the elastic bending of the ridge 12 as in the case of the first embodiment.

(Third Embodiment)

Next, a clip according to a third embodiment of the present invention will be described with reference to FIGS. 10 to 15c.

In the clip of the third embodiment, the same parts as or corresponding parts to those of the first embodiment are represented by the same reference numerals, and the detailed description thereof is omitted.

The clip of the third embodiment also comprises two parts of the grommet 1 and the pin 2 which are simultaneously molded with synthetic resin by injection molding.

Figure 13B:
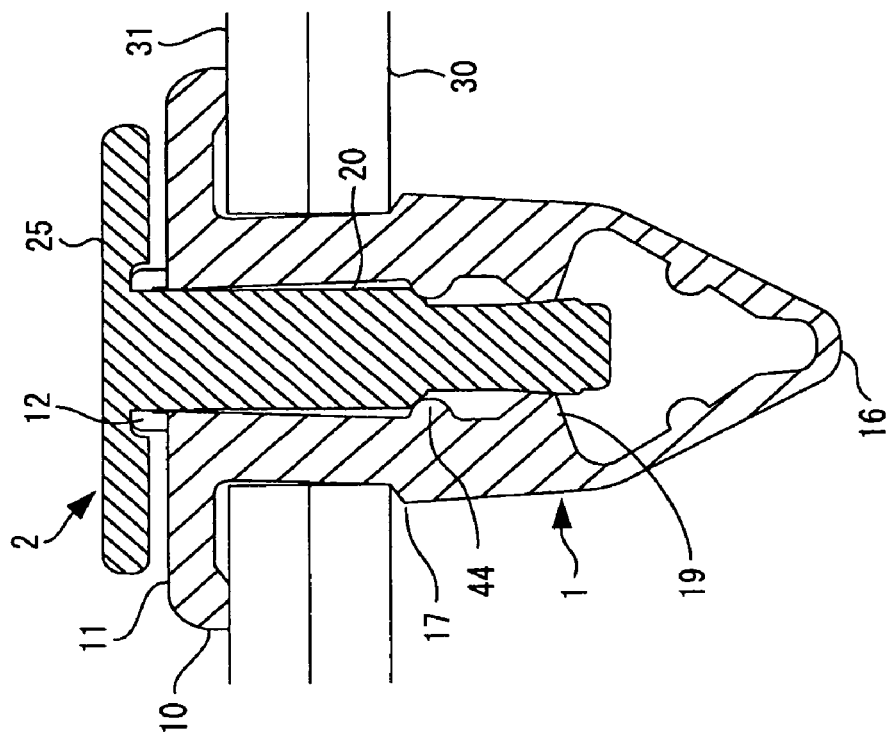
FIG. 13B is a cross-sectional view.
Figure 13A:
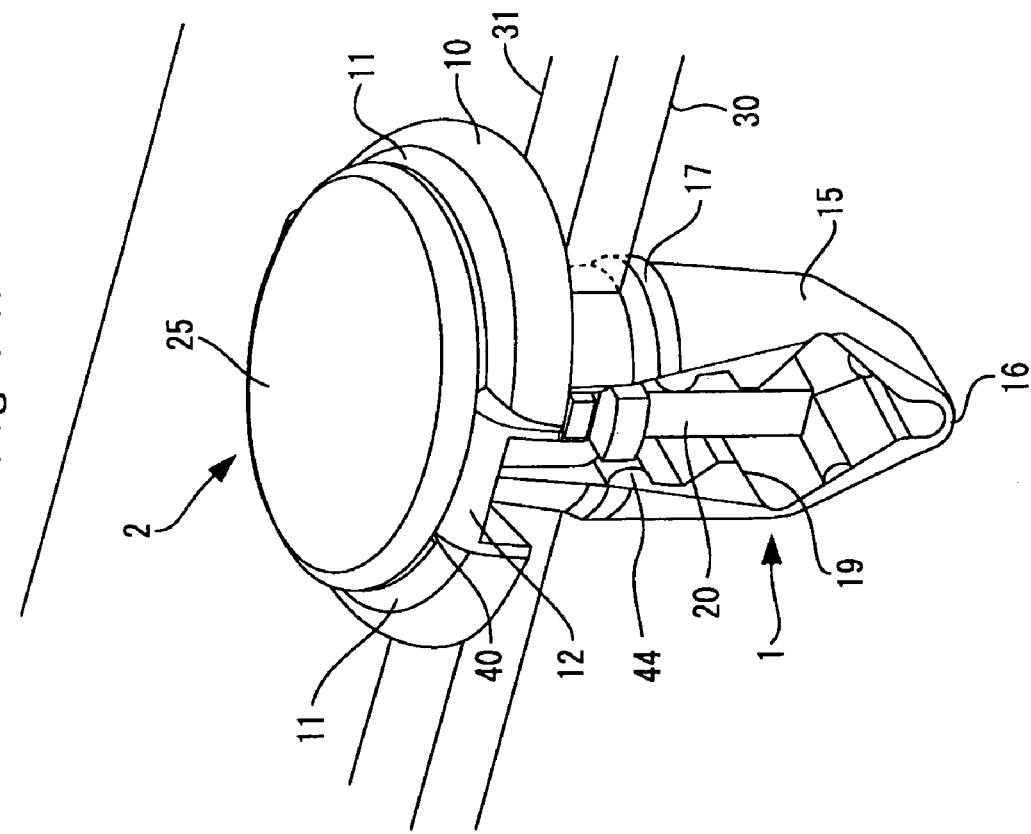
FIG. 13A is a perspective view showing the operation of the clip according to the third embodiment of the present invention subsequent to FIG. 12A.

The clip of this embodiment is designed in a disc-shape having no cut out portion at the head portion 25 of the pin 2. Accordingly, the head portion 25 of the pin 2 can be easily pushed. A recess groove 40 is formed on the back surface of the head portion 25 so as to confront the bridges 12 (see FIG. 11A). As shown in FIG. 13A, the recess groove 40 is engaged with the bridges 12 when the pin 2 is pushed in. The depth of the recess groove 40 is adjusted so that a slight gap is formed between the back surface of the head portion 25 of the pin 2 and the surfaces of the flange bodies 11 under the above state. When the pin 2 is pulled out, a tool such as a driver or the like may be inserted into the slight gap between the back surface of the head portion 25 of the pin 2 and the surfaces of the flange bodies 11 to draw out the head portion 25 of the pin 2 from the fixing hole 32.

Furthermore, as shown in FIG. 10, the clip of this embodiment is integrally formed so that each bridge 12 of the flange 10 and the shaft portion 20 of the pin 2 are joined to each other by small pieces 41.

Figure 14A:
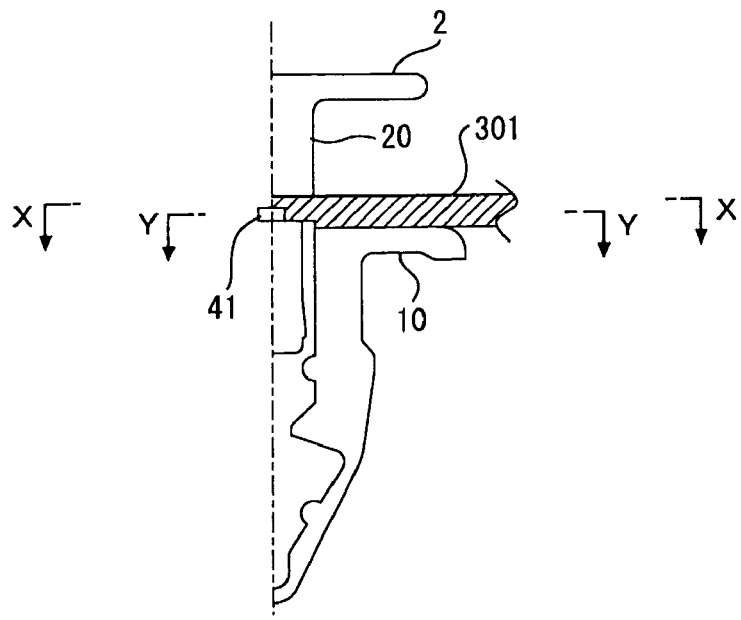
FIGS. 14A to 14D are diagrams showing the demold structure forming a small piece in the third embodiment of the present invention.

FIGS. 14A to 14D are diagrams showing a demolding structure for forming the small pieces 41. In FIG. 14A, a left half portion of the clip is omitted from the illustration. Furthermore, in each figure, hatching represents a mold, and hatching representing the cross-section of the clip is omitted.

Figure 14B:
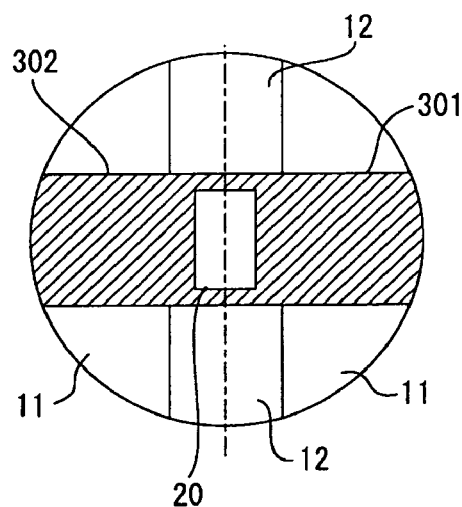
Figure 14C:
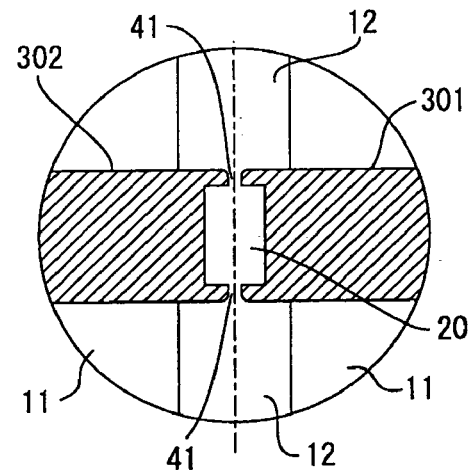

As shown in FIG. 14B, molds 301, 302 are inserted between the pair of bridges 12 to form the shaft portion 20 so that the shaft portion 20 is separated from the respective bridges 12. These molds 301, 302 are constructed so that the abutting end faces thereof are stepped and parts of the end faces thereof are separated from each other as shown in FIG. 14C. Accordingly, resin is filled in the spaced portion between the separated end faces to form the small pieces 41 for joining the respective bridges 12 and the shaft portion 20 of the pin 2.

Figure 14D:
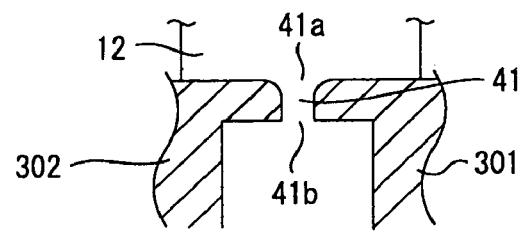

When the pin 2 is pushed into the grommet 1, these small pieces 41 are broken at the boundary between each small piece 41 and the shaft portion 20 of the pin 2 so that remain so as to project to the end faces of the respective bridges 12. That is, each of the small pieces 41 is shaped as shown in FIG. 14D so that the cross-sectional area thereof is largest at the boundary portion 41a between the small piece and the bridge 12 and also reduced toward the boundary portion 41b between the small piece and the shaft portion 20. Accordingly, when shear force is applied on the small piece 41, the small piece 41 concerned is broken at the boundary portion thereof with the shaft portion 20 because the boundary portion is small in cross-sectional area and fragile.

On the other hand, a guide face 42 with which the small piece 41 projecting from the bridge 12 is in sliding contact is formed on the shaft portion 20 of the pin 2 as shown in FIG. 15A. Separately from the guide face 42, projecting guide portions 43 which come in sliding contact with the end face of the bridge 12 to guide the pin 2 halfway in the process of pushing the pin 2 into the grommet 1 is formed on the shaft portion 20 of the pin 2. The projecting guide portion 43 is formed so as to project from both the end edges of the side surface of the shaft portion 20. The guide face 42 is formed at the intermediate portion between the projecting guide portions 43. That is, the shaft portion 20 is designed to be H-shaped in section as shown in FIG. 15B.

Here, the guide face 42 is designed to have an area which is in sliding contact with the small piece 41 till the pin 2 is further pushed into the grommet from the time when the projecting guide portion 43 comes into sliding contact with the end face of the bridge 12 in the process of pushing the pin 2 into the grommet 1 (see FIG. 15A, 15C).

Accordingly, the guide support based on the guide face 42 is smoothly shifted to the more stable guide support based on the projecting guide portion 43, so that backlash can be suppressed and the pushing operation can be stable implemented.

Next, the operation of the clip according to this embodiment will be described.

First, as shown in FIG. 11A and FIG. 11B, when the head portion 25 of the pin 2 is pushed to press the pin 2 into the grommet 1, the small piece 41 shown in FIG. 10 is broken from the shaft portion 20. When the small piece 41 is broken, the pin 2 is freely movable in the axial direction.

Here, the clip of this embodiment is not provided with the push-in convex portion (21), but provided with a press receiving portion 44 projecting inwards from the inner surface of the leg piece 15 of the grommet 1 in place of the push-in convex portion. The press-in receiving portion 44 interferes with the shaft portion 20 of the pin 1 to regulate the movement of the shaft portion 20 in the pushing direction.

As shown in FIGS. 12A and 12B, when the leg pieces 15 of the grommet 1 are inserted into the fixing hole 32 of the two stacked panels 30, 31 (objects to be fixed) and the head portion 25 of the pin 2 is pushed, the fitting convex portions 17 of the leg pieces 15 are fitted to the hole edge of the fixing hole 32, and the leg pieces 15 sag inwards. Under this state, the press-in receiving portion 44 is engaged with the shaft portion 20 as shown in FIG. 12B, and the press force from the shaft portion 20 is surely received.

When the pin 2 is further pushed, the fitting convex portions 17 of the leg pieces 15 are passed through the fixing hole 32, and the leg pieces 15 are elastically returned to the original state. Furthermore, the press-in receiving portions 44 which receive the press force from the shaft portion 20 expand to pass the shaft portion 20 of the pin 2 therethrough. Subsequently, the expanding and holding convex portions 19 are also pushed outwards by the shaft portion 20 of the pin 2, and the fitting processing portions 17 of the leg pieces 15 are fitted to the hole edge of the fixing hole 32 as shown in FIGS. 13A and 13B.

The present invention is not limited to the above embodiments.

For example, the demold structure shown in FIG. 5A, FIG. 5B and FIGS. 14A to 14D are an example, and the design of the mold may be arbitrarily changed.

Furthermore, in the above embodiments, the clip is inserted into the fixing hole of the object to be fixed by pushing the head portion of the pin, however, a work of pinching the flange of the grommet and inserting it into the fixing hole may be performed.

The shape of the outer peripheral edge of the leg piece is not necessarily set to the offset shape as shown in FIG. 7C, and it may be designed in a circular shape or a circumferentially circular shape in advance.

The invention claimed is:

1. A clip comprising: a grommet and a pin which are molded with resin;
    wherein the grommet has a flange and a pair of leg pieces that extend from the back surface of the flange and is pushed into a fixing hole formed in an object to be fixed;
    wherein the flange has a pair of right and left flange bodies, a pair of bridges for joining the respective flange bodies and an opening portion formed at a center portion surrounded by the flange bodies and the bridges;
    wherein the pair of leg pieces are joined to each other at the tip portions thereof;
    wherein the pin has a shaft portion and a head portion formed at one end of the shaft portion;
    wherein the shaft portion is molded concurrently together with the flange so as to form a one-piece construction and so that the shaft portion of the pin penetrates through an opening portion of the flange; and
    wherein peripheral walls of the opening portion are formed by respective end faces of the flange bodies and the bridges, and right and left peripheral walls formed by the end faces of the flange bodies and front and rear peripheral walls formed by the end faces of the bridges are respectively positionally offset from one another in a thickness direction so that the right and left peripheral walls do not respectively linearly intersect the front and rear peripheral walls along an entirety thereof in which the right and left peripheral walls are disposed below an upper surface of the flange and the front and rear peripheral walls are disposed above the upper surface of the flange; and
    wherein a space adjacently between the right and left peripheral walls and a space adjacently between the front and rear peripheral walls are each opened, in defining said opening portion of the flange, so as to extend to the outside of the flange respectively below and above the upper surface of the flange in directions respectively orthogonal to one another.

2. The clip according to claim 1, wherein the pair of leg pieces extend from the back surfaces of the pair of right and left flange bodies joined by the pair of bridges, and the pair of bridges are formed to be thinner than the flange bodies and elastically bendable.

3. The clip according to claim 2, wherein the pair of bridges project in the opposite direction to the leg pieces with respect to the surfaces of the pair of flange bodies.

4. The clip according to claim 3, wherein the pair of bridges can be elastically bent so that the front and rear end edges of the pair of right and left flange bodies are twisted and displaced in the vertically opposite directions, the leg pieces extend from the back surfaces of the pair of flanges, each of the leg pieces has, on the outer peripheral surface thereof, a fitting convex portion which is passed through a fixing hole having a circular section formed in the object to be fixed and fitted to an opening edge of the fixing hole, and the respective outer peripheral edges of the fitting convex portions formed on the pair of leg pieces are formed in an arcuate shape so that the centers thereof correspond to positions offset from the center axis of the grommet in the front-and-rear direction.

5. The clip according to claim 4, wherein engaging recess portions are formed on the shaft portion of the pin, projecting pieces are formed on the inner surface of the leg pieces, and the projecting pieces of the leg pieces which are kept to be expanded by the shaft portion in connection with the pushing operation of the pin engaging recess are engaged with the engaging recess portions, thereby regulating the movement of the leg pieces in the front-and-rear direction.

6. The clip according to claim 3, wherein a push-in convex portion having the following constructions (1) to (3) is formed on the shaft portion of the pin:
   (1) before the shaft portion of the pin is pushed in a direction to the tip of the leg pieces of the grommet, the push-in convex portion is disposed between the head portion of the pin and the flange of the grommet;
   (2) when the head portion of the pin is pushed to press the shaft portion in the direction to the tip of the leg pieces of the grommet, the push-in convex portion abuts against the flange of the grommet to transmit the pushing force to the flange; and
   (3) after the leg pieces of the grommet are pushed into the fixing hole of the object to be fixed and the flange abuts against the peripheral edge of the fixing hole, the push-in convex portion expands the opening by the pushing force and passes through the opening portion.

7. The clip according to claim 6, wherein the push-in convex portion abuts against the bridge of the flange to transmit the pushing force to the bridge.

8. The clip according to claim 3, wherein an expanding and holding convex portion having the following constructions (a),(b) is formed on the inner surface of each of the leg pieces of the grommet:
   (a) when the head portion of the pin is pushed to press the shaft portion in a direction to the tip of the leg pieces of the grommet, the tip of the shaft portion of the pin abuts against the expanding and holding convex portion, so that the expanding and holding convex portion receives the pushing force of the pin; and
   (b) after the leg pieces of the grommet are pushed into the fixing hole of the object to be fixed and the flange abuts against the peripheral edge of the fixing hole, the expanding and holding convex portion is pushed outwards by the pushing force received from the pin.

9. The clip according to claim 1, wherein the shaft portion is separated from the grommet, and dropout preventing convex portions are formed at the opposite position to the head portion through the flange, and the dropout of the shaft portion from the flange is regulated by the dropout preventing convex portions.

10. The clip according to claim 1, wherein a small piece for joining the bridge of the flange and the shaft portion of the pin is formed.

11. The clip according to claim 10, wherein when the pin is pushed into the grommet, the small piece is broken at the boundary between the small piece and the shaft portion of the pin, and it remains while projecting from the bridge of the flange.

12. The clip according to claim 11, wherein a guide face with which a small piece projecting from the bridge of the flange comes into sliding contact is formed on the shaft portion of the pin.

13. The clip according to claim 12, wherein a projecting guide portion which comes into sliding contact with the end face of the bridge of the flange to guide the pin halfway in the operation of pushing the pin into the grommet is formed on the shaft portion of the pin, and the guide face is formed to come into sliding contact with the small piece at least until the projecting guide portion comes into sliding contact with an inner surface of the bridge in the process of pushing the pin into the grommet.

\* \* \* \* \*